United States Patent
Blair et al.

(10) Patent No.: US 11,290,377 B2
(45) Date of Patent: *Mar. 29, 2022

(54) INTELLIGENT WIDE AREA NETWORK (IWAN)

(71) Applicant: Cisco Technology, Inc., San Jose, CA (US)

(72) Inventors: Dana L. Blair, Alpharetta, GA (US); Michael L. Sullenberger, San Jose, CA (US); Solomon T. Lucas, Sunnyvale, CA (US); Steven W. Wood, Ottawa (CA); Anand Oswal, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/017,861

(22) Filed: Sep. 11, 2020

(65) Prior Publication Data
US 2020/0412647 A1    Dec. 31, 2020

Related U.S. Application Data

(63) Continuation of application No. 14/792,698, filed on Jul. 7, 2015, now Pat. No. 10,797,995.

(51) Int. Cl.
*H04L 12/715* (2013.01)
*H04L 45/64* (2022.01)
(Continued)

(52) U.S. Cl.
CPC .......... *H04L 45/64* (2013.01); *H04L 12/4633* (2013.01); *H04L 45/02* (2013.01);
(Continued)

(58) Field of Classification Search
CPC ..... H04L 12/4633; H04L 45/04; H04L 45/74; H04L 45/02; H04L 45/64; H04L 41/508; H04L 41/5025
See application file for complete search history.

(56) References Cited

U.S. PATENT DOCUMENTS 7,260,804 B1    8/2007  Burstein et al.
7,724,732 B2    5/2010  Guichard et al.
(Continued)

FOREIGN PATENT DOCUMENTS

| CN | 101150587 A | 3/2008 |
|---|---|---|
| CN | 101510851 | 8/2009 |

OTHER PUBLICATIONS

European Search Report dated Nov. 18, 2016 in connection with European Application No. 16177385.
(Continued)

*Primary Examiner* — Mandish K Randhawa
(74) *Attorney, Agent, or Firm* — Behmke Innovation Group LLC; James M. Behmke; Jonathon P. Western

(57) ABSTRACT

In one embodiment, an electronic device maintains one or more tunnel-based overlays for a communication network. The communication network includes two or more physical provider networks. The device maintains a mapping between a particular application and the one or more overlays for the communication network. The device adjusts the mapping between the particular application and the one or more overlays for the communication network. The device causes one or more routers in the communication network to route traffic for the particular application according to the adjusted mapping between the application and the one or more overlays for the communication network.

20 Claims, 9 Drawing Sheets

(51) Int. Cl.
*H04L 12/46* (2006.01)
*H04L 45/02* (2022.01)
*H04L 45/00* (2022.01)
*H04L 45/74* (2022.01)
*H04L 41/5025* (2022.01)
*H04L 41/50* (2022.01)

(52) U.S. Cl.
CPC .............. *H04L 45/04* (2013.01); *H04L 45/74* (2013.01); *H04L 41/508* (2013.01); *H04L 41/5025* (2013.01)

(56) References Cited

U.S. PATENT DOCUMENTS

| | | |
|---|---|---|
| 8,181,009 B2 | 5/2012 | Watts et al. |
| 8,565,098 B2 | 10/2013 | Liu et al. |
| 8,868,735 B2 | 10/2014 | Wang et al. |
| 9,019,962 B1 | 4/2015 | Ghosh |
| 9,036,504 B1 | 5/2015 | Miller et al. |
| 2006/0053231 A1 | 3/2006 | Lange et al. |
| 2007/0214505 A1 | 9/2007 | Stavrou et al. |
| 2009/0106831 A1 | 4/2009 | Wu |
| 2012/0159234 A1 | 6/2012 | Mehta et al. |
| 2012/0250682 A1 | 10/2012 | Vincent et al. |
| 2016/0380973 A1* | 12/2016 | Sullenberger ....... H04L 63/0272 726/15 |

OTHER PUBLICATIONS

Cisco: "Performance Routing version 3 for IOS-XE release," Nov. 2, 2014, Retrieved from the Internet: URL:http://www.cisco.com/c/dam/en/US/td/docs/ios-xml/ios/pfrv3/configuration/workflow/pfrv3-work-flow-guide.PDF.

Cisco: "Intelligent WAN Technology Design Guide," Jan. 2, 2015, Retrieved from the Internet: URL:http://www.cisco.com/c/dam/en/us/td/docs/solutions/CVD/Jan2015/CVD-IWANDesignGuide-Jan15.pdf.

Cisco: "PfR:Solutions:NBAR—DocWiki," Mar. 6, 2014, Retrieved from the Internet: URL:http://docwiki.cisco.com/wiki/PfR:Solutions:NBAR.

Prat, PfR (Cisco Performance Routing), Oct. 15, 2012.

* cited by examiner

INTELLIGENT WIDE AREA NETWORK (IWAN)

CROSS-REFERENCE TO RELATED APPLICATION

This application is a Continuation application of U.S. patent application Ser. No. 14/792,698, filed on Jul. 7, 2015, entitled INTELLIGENT WIDE AREA NETWORK (IWAN), by Blair, et al., the entire contents of which are incorporated herein by reference.

TECHNICAL FIELD

The present disclosure relates generally to computer networks, and, more particularly, to techniques to implement an intelligent wide area network.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an electronic device maintains one or more tunnel-based overlays for a communication network. The communication network includes two or more physical provider networks. The device maintains a mapping between a particular application and the one or more overlays for the communication network. The device adjusts the mapping between the particular application and the one or more overlays for the communication network. The device causes one or more routers in the communication network to route traffic for the particular application according to the adjusted mapping between the application and the one or more overlays for the communication network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
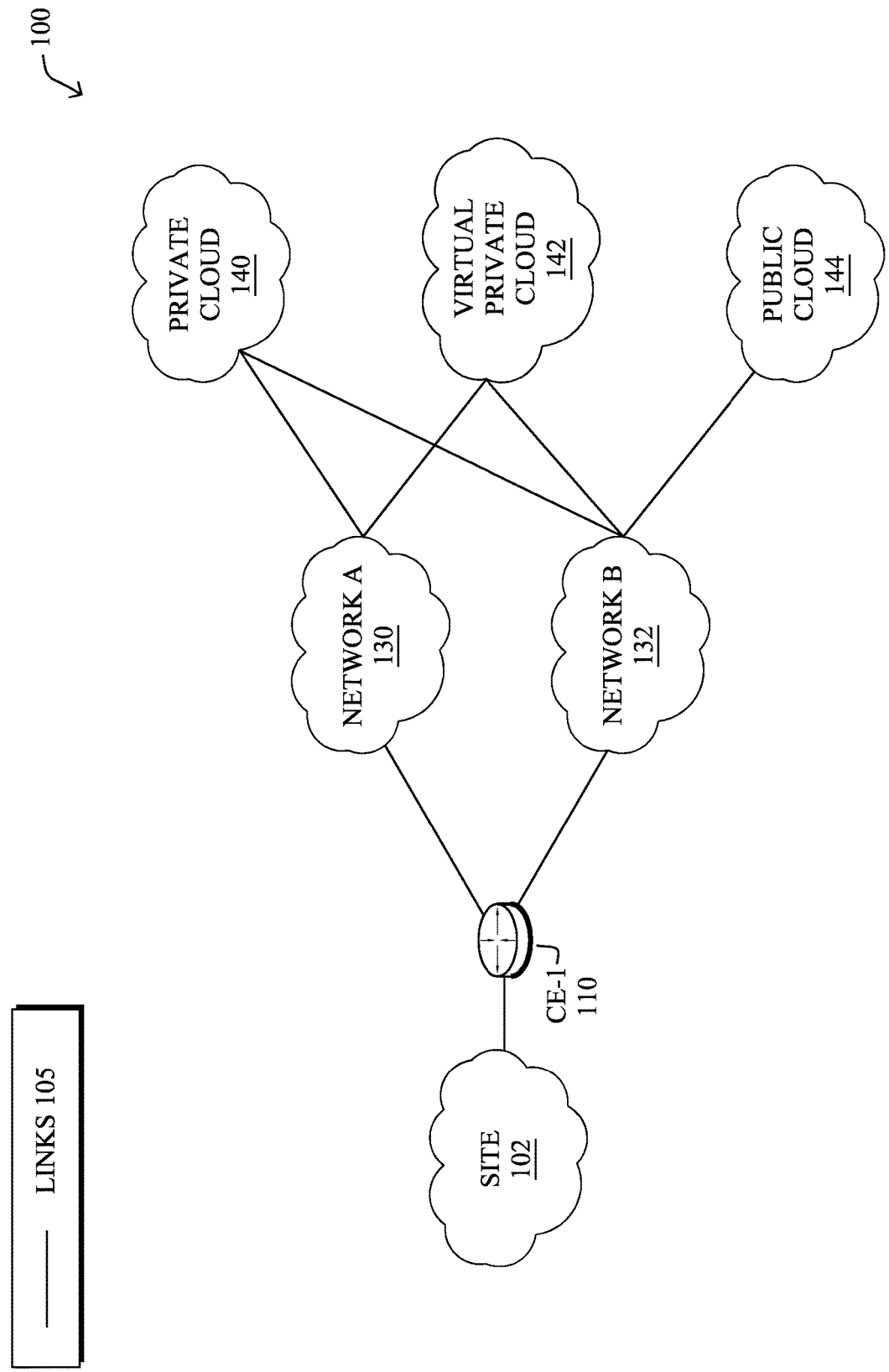
FIGS. 1A-1B illustrate an example communication system.

FIG. 1A is a schematic block diagram of an example communication system 100, according to various embodiments. As shown, a site 102 (e.g., a branch of an enterprise network, etc.) may connect the various computing devices located at site 102 (e.g., a LAN of devices) to various remote devices/services via one or more customer edge (CE) routers 110 and links 105. Such remote devices/services may exist within a private cloud 140, a virtual private cloud 142, a public cloud 144, or the like. In general, one or more CE routers 110 (e.g., router CE-1, etc.), may provide connectivity between devices on one or more LANs of site 102 with the devices/services associated with clouds 140-144. For example, public cloud 144 may include a publicly available web server, whereas private cloud 140 may include a server located within a data center operated by the same entity associated with site 102.

Data packets (e.g., traffic/messages) may be exchanged among the nodes/devices of the communication system 100 over links 105 using predefined network communication protocols such as TCP/IP, User Datagram Protocol (UDP), Asynchronous Transfer Mode (ATM) protocol, Frame Relay protocol, or any other suitable protocol. Those skilled in the art will understand that any number of nodes, devices, links, etc. may be used in the system, and that the view shown herein is for simplicity.

A particular site may be connected to clouds 140, 142, and/or 144 via any number of different provider networks. For example, as shown, site 102 may be connected to a first network 130 and also to a second network 132, the links to which may exhibit very different network service level agreement (SLA) characteristics. Connections between site 102 and networks 130-132 may comprise, in various embodiments, public Internet connections, multiprotocol label switching (MPLS) networks, or the like. In one embodiment, networks 130, 132 may even be associated with different service providers.

For the sake of illustration, a given site may fall under any of the following categories:

1.) Site Type A: a site connected using a private or virtual private network (VPN) link via a single CE router and a single link, with potentially a backup link (e.g., a 3G/4G/LTE backup connection). For example, CE-1 shown may support site 102 via a link to network 130 (e.g., an MPLS network), potentially also with a backup network connection via a cellular wireless connection.

2.) Site Type B: a site connected using two VPN links (e.g., from different service providers), with potentially a backup link (e.g., a 3G/4G/LTE connection). In one example, dynamic tunneling techniques, such as Dynamic Multipoint Virtual Private Network (DMVPN) by Cisco Systems™ or the like, may be used to dynamically build VPN tunnels over one or more MPLS networks, one or more Internet connections, etc. For example, such a technique may employ the use of Generic Routing Encapsulation (GRE) tunnels, Internet Protocol Security (IPSec) tunnels, etc., to provide an overlay layer on top of the physical network(s).

A site of type B may itself be of different types:

2a.) Site Type B1: a site connected using two MPLS VPN links (e.g., from different service providers), with potentially a backup link (e.g., a 3G/4G/LTE connection). For example, networks 130 and 132 may be different MPLS networks, in one embodiment.

2b.) Site Type B2: a site connected to the network using one MPLS VPN link and one link connected to the public Internet, with potentially a backup link (e.g., a 3G/4G/LTE connection). For example, network 130 may be an MPLS network, whereas the connection to network 132 may be a public Internet connection, potentially also with a cellular wireless backup link.

2c.) Site Type B3: a site connected to the network using two links connected to the public Internet (e.g., via different service providers), with potentially one or more backup links (e.g., a 3G/4G/LTE connection). For example, the connections between CE-1 and both of networks 130, 132 may be public Internet connections via different service providers.

As would be appreciated, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one provider network while a second CE router is connected to the other provider network), with potentially one or more backup links (e.g., a wireless 3G/4G/LTE backup link). For example, site 102 may include a first CE router 110 connected to network 130 and a second CE router 110 connected to network 132, in another embodiment.

As would be appreciated, any number of devices, configurations, and network connections may be used to provide remote communications to and from a given site. Further, while certain topologies are depicted, such as with a site connected to different service provider networks, other topologies may be used in other embodiments (e.g., site 102 may be connected to three different service provider networks, four different networks, etc.).

Figure 1B:
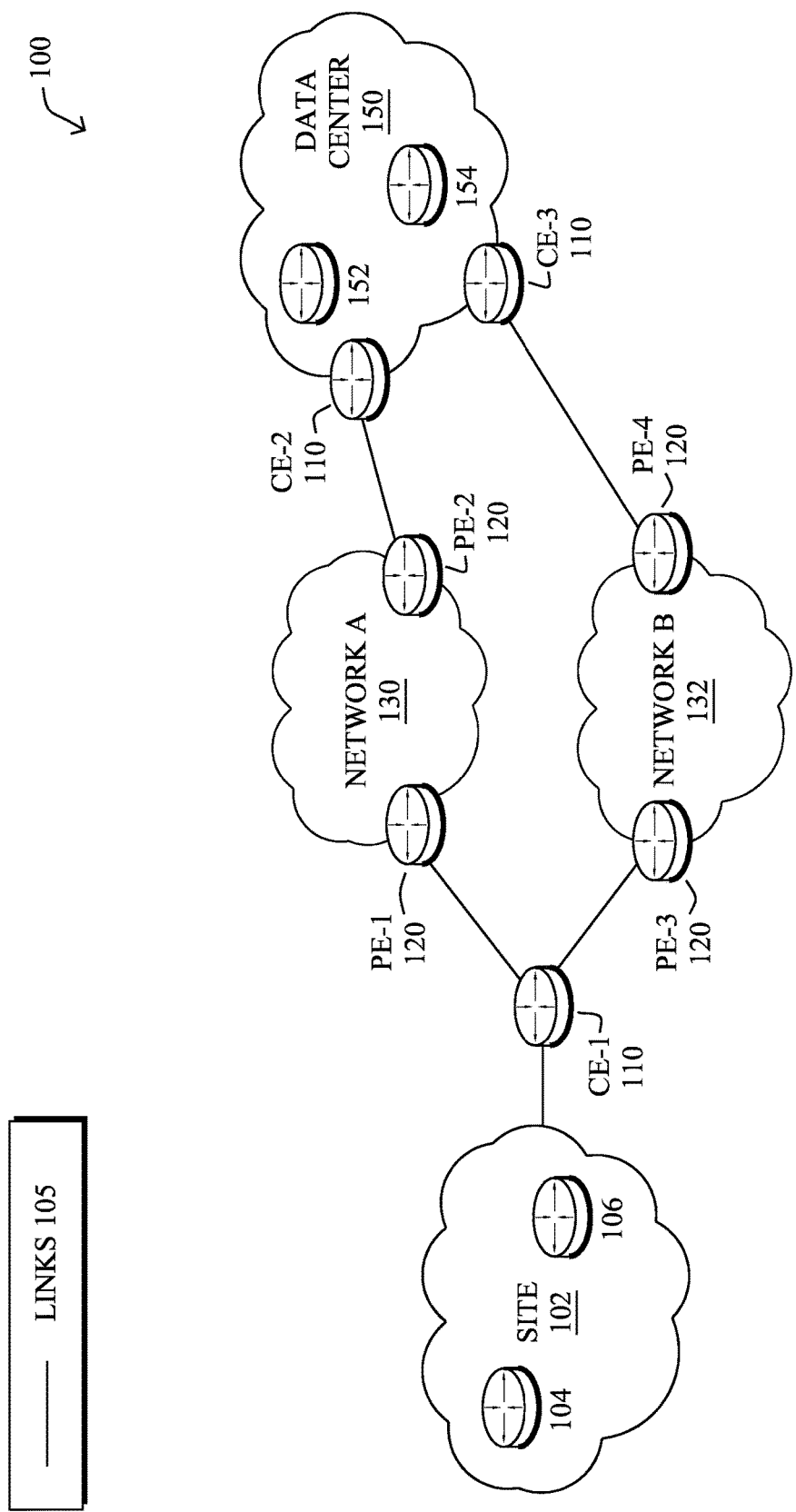

FIG. 1B illustrates an example of communication system 100 in greater detail, according to various embodiments. As shown, site 102 may be connected to a data center 150 via networks 130 and 132. For example, assume that branch 102 and data center 150 are associated with the same organization, e.g., as part of an enterprise network. Such an organization's network may include any number of local sites/branches/campuses/etc. that are serviced by data center 150 (e.g., as part of a hub-and-spoke configuration, etc.).

Data center 150 may include any number of servers, network controllers, or other devices that provide services to the devices associated with site 102. For example, as shown, data center 150 may include devices 152-154 that provide remote services to devices 104-106 and/or CE-1 located at site 102. In some embodiments, devices 152-154 may be part of a cloud environment that includes any number of different computing devices. Devices 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, communication system 100 may also include any number of local networks, data centers, cloud environments, devices/nodes, servers, etc.

As shown, CE router CE-1 may be connected to corresponding provider edge (PE) routers 120 for the different networks 130 and 132. Similarly, data center 150 may include one or more CE routers 110 (e.g., CE-2, CE-3) that are connected to corresponding PE routers in networks 130 and 132. As noted previously, in some cases, networks 130 and 132 may be networks maintained by different service providers and may be of the same or different type (e.g., MPLS, Internet, etc.).

Numerous types of application traffic may be flowing through current day networks. For example, a particular CE router 110 located at a customer site may provide and receive different forms of application traffic that is communicated through communication system 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, web data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

To ensure that certain degrees of performance are met for the network traffic, the various devices in system 100 (e.g., routers 110, 120, devices 152-154, etc.) may employ any or all of the following mechanisms:

Application Visibility and Control (AVC): this mechanism incorporates into the routing devices application recognition and performance monitoring capabilities traditionally available only as dedicated devices. For example, router CE-1 at site 102 shown may be configured to support AVC. In general, AVC allows application awareness to be built into the network infrastructure, plus visibility into the performance of applications running on the network. AVC also allows for enabling of per-application policy for granular control of application bandwidth usage. A typical AVC implementation may perform the following: application recognition, metrics collection and reporting, and management/control. For example, CE-1 may use the Network Based Application Recognition (NBAR) by Cisco Systems, Inc., or another mechanism (e.g., by using deep packet inspection, other application recognition techniques described below, etc.), to associate traffic flows with specific applications. Collected performance metrics such as packet loss, bandwidth usage, etc., may be associated with the identified applications at the router and then reported to a supervisory device (e.g., one of devices 152-154, etc.), which may make any number of adjustments to the network, in response. The AVC mechanism may further operate in conjunction with a traffic flow analysis and reporting mechanism operable to distinguish between traffic flows and provide summarized reports to a supervisory device. An example of such a mechanism is NetFlow by Cisco Systems, Inc.

Performance Routing (PfR): this mechanism allows traffic to be automatically switched between multiple paths based on configured thresholds for network attributes such as delay, jitter, and loss. These attributes may be tracked using probes that are generated for each DSCP, source-destination tuple, etc. Also, these configured thresholds are based on the perceived tolerance of applications that are being sent over the network. Once these thresholds are crossed (e.g., if the delay increases above 50 ms or the jitter increases by 5%), threshold crossing alerts may be sent out based on which the traffic is switched over to alternate and pre-configured paths. Once traffic has been moved, probes may continue to be sent out and after a pre-configured time period, based on the probe measurements, traffic is reverted to the original path. For example, assume that network 130 is an MPLS network and that network 132 provides an Internet connection to site 102. In such a case, CE-1 may use PfR techniques to switch between communicating with data center 150 via networks 130 and 132, depending on the measured characteristics of the network and the policy-defined requirements for the specific network traffic.

These and other mechanisms may be used within a network such as communication system 100 to ensure that certain SLAs are met for a given application. For example, a supervisory APIC (e.g., one of devices 152-154, etc.) may operate as a policy engine that works in conjunction with the monitoring/reporting mechanisms local to the deployed routers, to ensure that traffic for a particular application experiences a desired level of performance.

Figure 2:
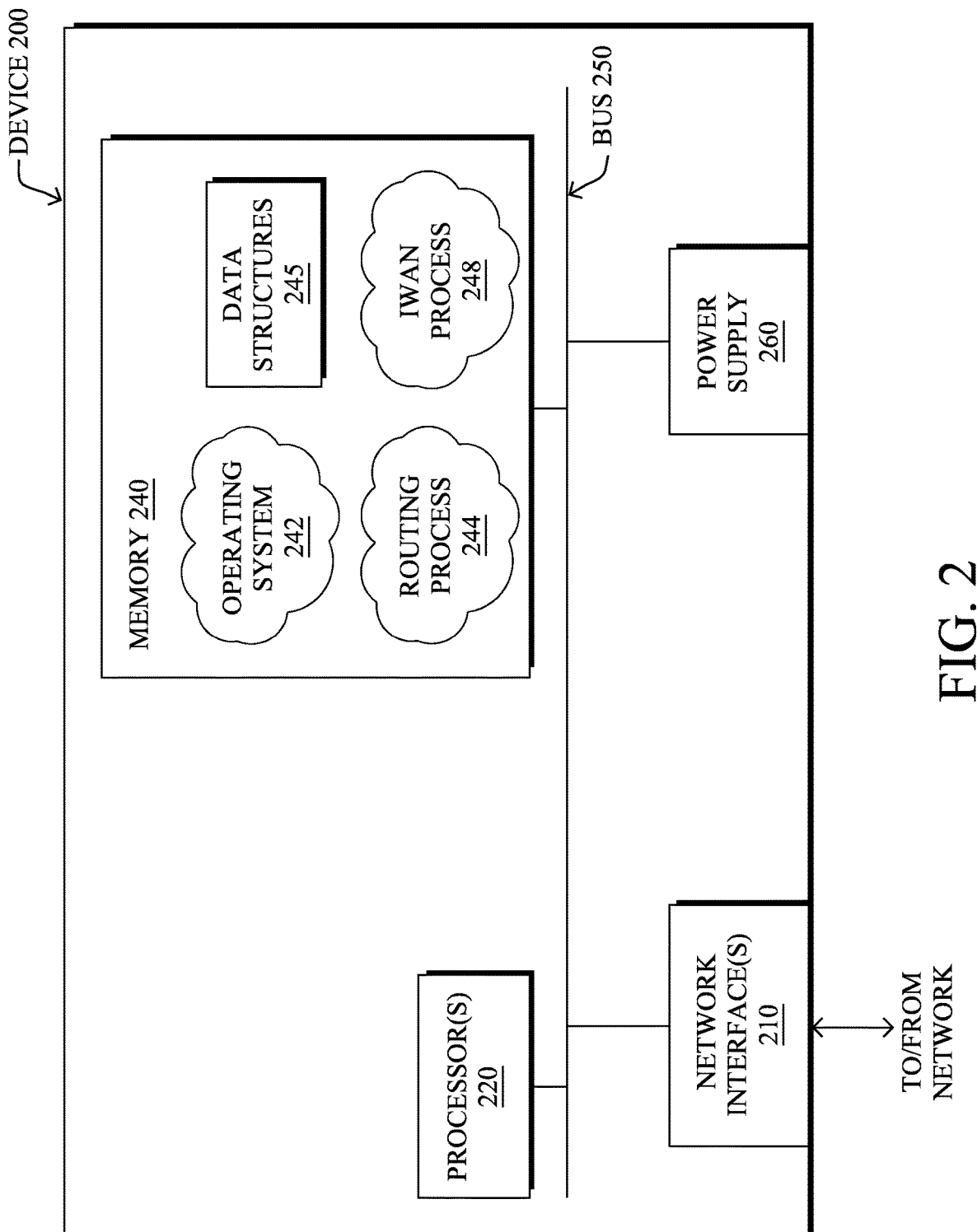
FIG. 2 illustrates an example network device/node.

FIG. 2 is a schematic block diagram of an example node/device 200 that may be used with one or more embodiments described herein, e.g., as any of the devices shown in FIGS. 1A-1B, particularly the CE routers 110, PE routers 120, and/or devices 104-106 and 152-154 (e.g., a network controller located in a data center, etc.), any other computing device that supports the operations of system 100 (e.g., switches, etc.), or any of the other devices referenced below. The device 200 may also be any other suitable type of device depending upon the type of network architecture in place. Device 200 generally comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the communication system 100. The network interfaces may be configured to transmit and/or receive data using a variety of different communication protocols. Notably, a physical network interface 210 may also be used to implement one or more virtual network interfaces, such as for virtual private network (VPN) access.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, an intelligent WAN (IWAN) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining a virtual routing and forwarding (VRF) instance, or tunneling protocols, such as for MPLS, generalized MPLS (GMPLS), etc., each of which will be understood by those skilled in the art. In one embodiment, routing process 244 may be operable to establish dynamic VPN tunnels, such as by using a DMVPN overlay onto the network(s).

Routing process/services 244 may further be configured to perform additional functions such as security functions, firewall functions, AVC or similar functions, NBAR or similar functions, PfR or similar functions, combinations thereof, or the like. As would be appreciated, routing process/services 244 may be configured to perform any of its respective functions independently or in conjunction with one or more other devices. In other words, in some cases, device 200 may provide supervisory control over the operations of one or more other devices. In other cases, device 200 may be controlled in part by another device that provides supervisory control over the operations of device 200.

As noted above, a shift to cloud based solutions is underway, as WAN bandwidths continue to grow. Cloud based solutions are viewed by many organizations as being able to reduce information technology (IT) costs. In addition, modern business Internet services have improved considerably since network architects first opted to use premium-priced WAN connections for branch WAN connectivity. Notably, premium-priced WAN services were originally selected by many enterprises because public Internet services at the time lacked the reliability required by businesses. Today, however, the reliability of Internet services is approaching that of premium-priced WAN services. Nonetheless, MPS VPN services continue to be priced at a premium when compared to Internet services. Internet services also typically differ from private IP services (e.g., MPLS VPN, etc.) in that Internet service provider (ISPs) use oversubscription to minimize their service cost delivery. This can result in degraded performance during peak usage periods. Congestion at peering points also can be a source of performance degradation.

Intelligent Wide Area Networks (IWANs)

The techniques herein provide for a transport independent network overlay that can use any number of different combinations of underlying service provider networks (e.g., Internet and MPLS, Internet and Internet, MPLS and MPLS, etc.). In further aspects, the techniques herein allow provide for intelligent path selection, improved application performance, and secure connectivity with dual transport links at the branch to improve the availability, quality, and security of the WAN while also reducing costs. In some aspects, the techniques herein may provide policies to be extended such that islands/silos of policies may operate collectively. In another aspect, the techniques herein allow for overlay mobility, such as when an application/service migrates across data centers, etc. In yet another aspect, the techniques herein allow for multi-homing with DMVPN and direct Internet access (DIA).

Specifically, according to one or more embodiments of the disclosure as described in detail below, an electronic device maintains one or more tunnel-based overlays for a communication network. The communication network includes two or more physical provider networks. The device maintains a mapping between a particular application and the one or more overlays for the communication network. The device adjusts the mapping between the particular application and the one or more overlays for the communication network. The device causes one or more routers in the communication network to route traffic for the particular application according to the adjusted mapping between the application and the one or more overlays for the communication network.

Illustratively, the techniques described herein may be performed by hardware, software, and/or firmware, such as in accordance with the IWAN process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols and as such, may be processed by similar components understood in the art that execute those protocols, accordingly.

Operationally, the techniques herein may generally be implemented by any central or distributed policy engine located within the communication system (e.g., one of devices 152-154 shown in FIG. 1B, distributed among routers 110 and/or 120, etc.). In one embodiment, and in accordance with the architecture described herein, an APIC controller may be used, which operates between the applications and network infrastructure, and abstracts the network infrastructure and provides higher level, intent-based policy interfaces to applications.

Figure 3:
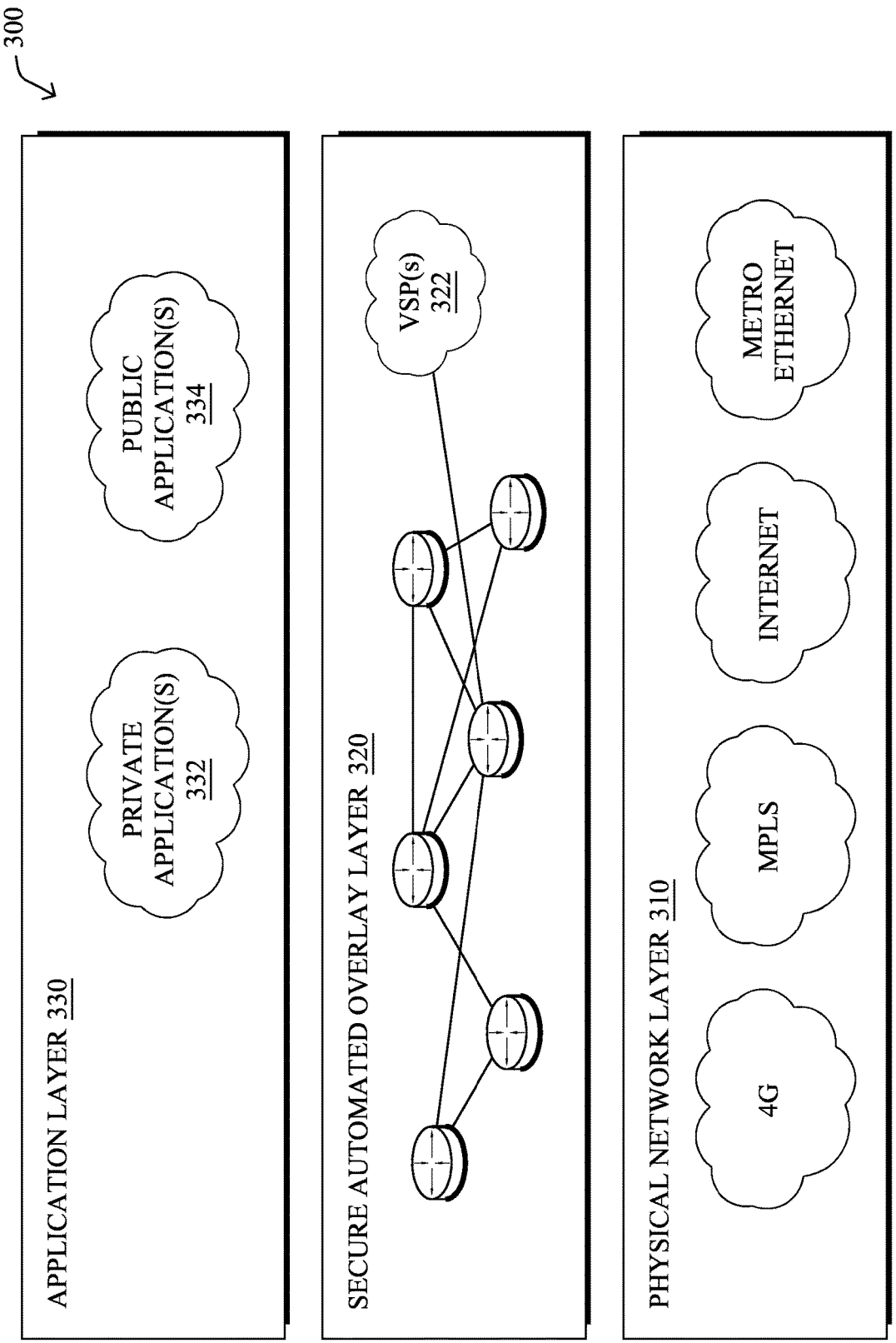
FIG. 3 illustrates an example system architecture for an intelligent wide area network (WAN)

An example system architecture for an IWAN is shown in FIG. 3, according to various embodiments. As shown, IWAN architecture 300 may include a physical network layer 310 that may include any number of different types of networks. Notably, as described above, an enterprise communication system between different sites and/or virtual services may use any number of combinations of physical provider networks as part of the physical network layer 310, in various embodiments. For example, a given branch may be connected to an MPLS network and an ISP network, different ISP networks, a cellular network, a metropolitan area Ethernet (Metro-E) network, etc.

According to various embodiments, IWAN architecture 300 may include a secure automation overlay layer 320 that sits on top of the physical network layer 310 and may provide connectivity between the various branches of an enterprise, any number of virtual service providers (VSPs), etc. In particular, overlay layer 320 may use DMVPN tunneling over the various provider networks in physical network layer 310. In some embodiments, overlay layer 320 may use a tunnel-in-tunnel approach, with the outer tunnel being used to tunnel an encapsulated VPN tunnel to a desired destination. For example, overlay layer 320 may use point-to-multipoint Generic Routing Encapsulation (mGRE) tunnels encapsulated within IPSEC tunnels. As would be appreciated, such an approach would also add a degree of security to overlay layer 320, as the inner mGRE tunnel may be encrypted within the IPSEC tunnel. Routing decisions as part of overlay layer 320 may also be made via the use of protocols such as the Next-Hop Resolution Protocol (NHRP) and/or dynamic routing protocols such as OSPF, BGP, the Routing Information Protocol (RIP), Enhanced Interior Gateway Routing Protocol (EIGRP), or the like.

In various embodiments, the routers or other network elements used to implement overlay layer 320 may use virtual routing and forwarding (VRF) techniques, to provide a separation between the address space of the enterprise and that of the service providers within physical network layer 310. In particular, VRF allows routing tables, also known as forwarding information bases (FIB s) to co-exist within the same router within different VRF instances. For example, a given router may maintain a global/enterprise VRF for user traffic routing and one or more separate VRF instances for each physical interface for purposes of DMVPN tunnel establishment. In other words, a given router may maintain a front door VRF (fVRF) that faces the WAN and a global VRF that supports the internal LAN of the router and the DMVPN tunnel interfaces.

Above the secure automation overlay layer 320 may be an application layer 330 that interfaces with secure automation overlay layer 320, in various embodiments. As shown, application layer 330 may include one or more private applications 332 and/or one or more public applications 334. For example, private applications 332 may include video applications, audio applications, ERP applications, CRM applications, etc., that may be internal to the enterprise. In contrast, public applications 334 may include applications that access the public cloud (e.g., public cloud 144) such as web applications, etc. Thus, applications 332-334 in application layer 330 may interact with secure automation overlay layer 320 for purposes of network addressing, etc. For example, assume that a particular application 332 is supported by a particular server (e.g., within a physical data center of the enterprise, within a virtual data center, etc.). As part of the operation of overlay layer 320, the address of the application server may be maintained within an enterprise/global address space, as opposed to being tied to the address functions of the physical providers in physical network layer 310 (e.g., by maintaining a mapping between addresses).

By utilizing overlay layer 320 between application layer 330 and physical network layer 310, the techniques herein may provide the following:

1. Enterprise WAN aggregation over multiple, concurrent access types;
2. Integration of WAN with campus, branch, and data center networks;
3. Application visibility, application-aware network functions and application optimization;
4. Common enterprise policy architecture; and
5. Enterprise Network Function Virtualization (E-NFV).

Notably, architecture 300 and the techniques herein establish a framework and partition of functions with proper layering and abstraction of network and application functions. This minimizes dependencies between features at different layers and allows independent actors to orchestrate the functionality needed at these layers without having to resort to changes in layers above or below, to roll out new capabilities.

In various embodiments, any coupling or communication between layers 310, 320, and 330 may be provided by well-defined interfaces such as, but not limited to, software application programming interfaces (APIs), service advertisement or control protocol service data units (SDUs), or protocol data units (PDUs). User, customer, or operator interactions may also be context specific, depending on the individual's role. In particular, the individual may interact with the appropriate layer (e.g., one of layers 310, 320, and 330), given the goals the user is trying to accomplish.

In one example, an application administrator may interface only with application layer 330 to map the service chains and components used to implement an enterprise application or to access a public cloud application. The application administrator need not interact at all with overlay layer 320 or with the transport/physical network layer 310. This abstraction may allow for faster rollouts of new applications driven by fast changing business processes within the enterprise. In addition, the application administrator need not have any networking knowledge. In some embodiments, application layer 330 may request services from overlay layer 320 (e.g., segmentation mapping, quality of service policy, service chain elements needed in the path, path performance policies, etc.) and overlay layer 320 may build or otherwise map to an overlay segment that implements the WAN path and services request and, in some cases, return an indication of success or failure to application layer 330.

In another example, a network designer or administrator may design and implement the WAN network that provides the service set to application layer 330 sufficient to implement the application service chains and policies needed by the application administrator to deploy applications. If a new application or business process requires services that the WAN cannot provide, then the network designer or administrator may be required to add these new services to overlay layer 320 and expose them through APIs or service advertisements.

In a further example, security operations (SecOps) personnel may be charged with developing the security policy requirements for the network. Other tasks of SecOps personnel may include controlling authentication certificates (e.g., to establish IPSec tunnels), intrusion detection/prevention policies that the overlay or service nodes (e.g., cloud-based services, etc.) can provide, etc.

In various embodiments, service and capability advertisements between layers 310, 320, and 330 may enable the WAN to track the mobility of applications between data centers and between Layer 3 subnets in the data centers. In addition, the interactions between layers 310, 320, and 330 may enable "cloud bursting" whereby infrastructure service vendors (e.g., cloud service providers) may provide elasticity to applications/services when temporary capacity is needed to expand or deploy new services. For example, messaging between layers 310-330 in architecture 300 may allow an application to dynamically switch to using a cloud-based server or vice-versa as necessary. In such a scenario, tracking the movement of application/service locators between different WAN endpoints may enable optimal routing to be made. In addition, the overlay layer 320 may be adjusted automatically, without the need for the application/service locator to be renumbered or manual changes to be made to the overlay.

Service and capability advertisements within architecture 300 between network elements and a network controller may also allow for the self-discovery and self-configuration of the WAN elements in an existing network, in one embodiment. For example, the network controller may automatically discover and add network elements according policy, in response to receiving such advertisements.

In some embodiments, architecture 300 may utilize a controller-based approach whereby certain functions are centralized on a network controller. However, state and control may be centralized only if it makes sense for simplifying the control and deployment of the network (e.g., according to policy), while maintaining the capability to scale appropriately. In other words, architecture 300 may use a controller-based paradigm by default, but switch to a distributed approach when and if needed.

Figure 4:
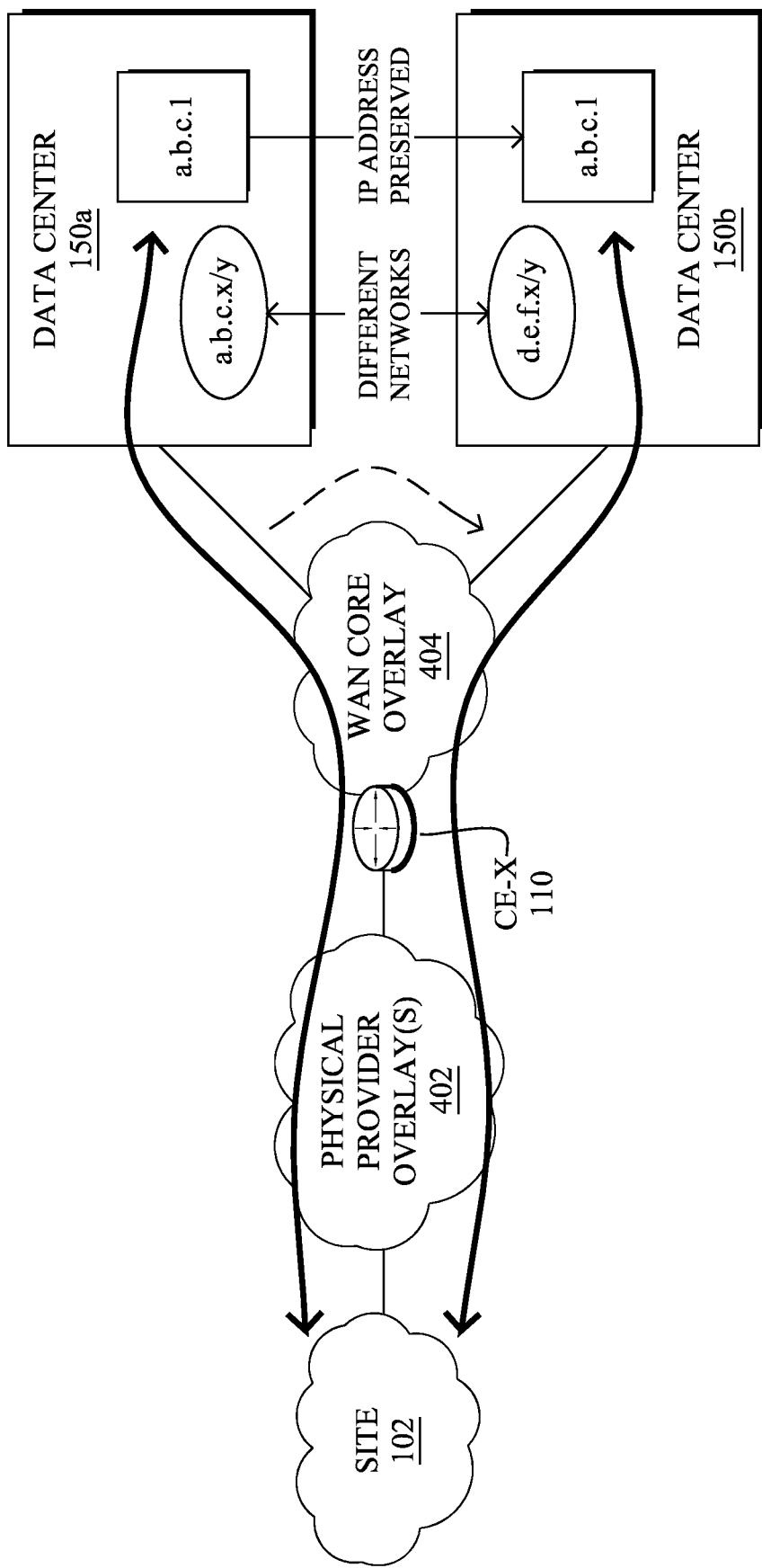
FIG. 4 illustrates an example of an application migration within an intelligent WAN.

Referring now to FIG. 4, an example of an application migration is shown, according to various embodiments. As shown, assume that a site 102 is communicatively connected to different data centers 150*a* and 150*b* using architecture 300 described above. Notably, one or more tunnel-based, physical provider overlays 402 (e.g., Layer 3 overlays) may be established over any number and types of physical service provider networks (e.g., ISP networks, MPLS networks, etc.) and one or more border routers 110 that employ PfR mechanisms. A WAN core overlay may then provide connectivity between router 110 and data centers 150*a* and 150*b*.

As noted previously, architecture 300 may include an overlay layer 320 (e.g., overlays 402-404) that is transport independent. In particular, overlay layer 320 may separate the enterprise address space from that of the transport/physical service provider address space. Peering between the enterprise and service provider(s) may then be simplified to a single IP address routable in the transport provider address space. The overlay may also combine and eliminate control protocols where possible and use mapping services to resolve routes on demand from a central network controller. As a result, the need to set up routing protocols in each element is minimized and allows the controller to have a full view of the network and deal with redistribution and route tagging to avoid loops. Network scaling may be accomplished by segmenting the network into smaller networks domains and/or by using parallel network controller instances.

As shown in FIG. 4, the overlay layer may be aware of the mobility of applications/services within the domains attached to the WAN (e.g., datacenters, campuses, branches, etc.). For example, assume that data centers 150a and 150b are each on separate networks having different address spaces. Also, assume that a particular application makes use of a service provided by a server in data center 150a. In such a case, the application service/server may be associated with a single IP address within the enterprise address space and the overlay layer may maintain the appropriate routing information to route the application traffic between site 102 and the server/service in data center 150a.

Continuing the example of FIG. 4, assume that the application migrates from using the server/service in data center 150a to using a corresponding server/service in data center 150b. Various migration/mobility scenarios are as follows:
1. Application/server workload migration (e.g., between data centers, as shown in FIG. 4);
2. "Cloud bursting" to and from an IaaS provider (e.g., between a data center and a virtual private cloud); and
3. Branch/Site Mobility (e.g., physical site moves, mobile hospitals, broadcast trucks, automatic teller or lottery machine moves, etc.).

Such application migrations may be detected by the overlay layer (e.g., by the network controller) via advertisement or other control message passing between the application layer and the overlay layer (e.g., via APIs, etc.).

All of these cases boil down to IP address locator mobility, i.e., the ability to move servers and applications mapped to IP addresses off their home subnet, as shown in FIG. 4.

In various embodiments, the route control and overlay may be scalable to large networks of 10,000 elements or greater, and this scale may be achieved by segmenting the network into smaller domains and/or via the use of parallel controller instances. In one embodiment, the overlay layer may support dynamic segmentation. Notably, the application layer or the overlay layer may be able to control segmentation and mapping during network operations without requiring network elements to reboot. For example, the controller may orchestrate the creation of new segments and the mapping of users and applications to the segments based on business-level bindings (e.g., guest users are restricted to using only ISP paths, etc.). Segmentation may be based on any or all of the following:
Multi-tenant: business entity (independent subsidiary), internal business/operating unit, business function, MSP tenant; and
Business Policy: application or resource location, user identity/privileges, user intent (good user, bad use, special user), service level, availability and infrastructure location (i.e., which data center).

In further embodiments, the overlay layer may also support IPv6 transition mechanisms and coexist with native IPv6 transport support (e.g., by providing smooth IPv4 to IPv6 transition through overlay tunneling of IPv4 in IPv6 or vice/versa).

Figure 5:
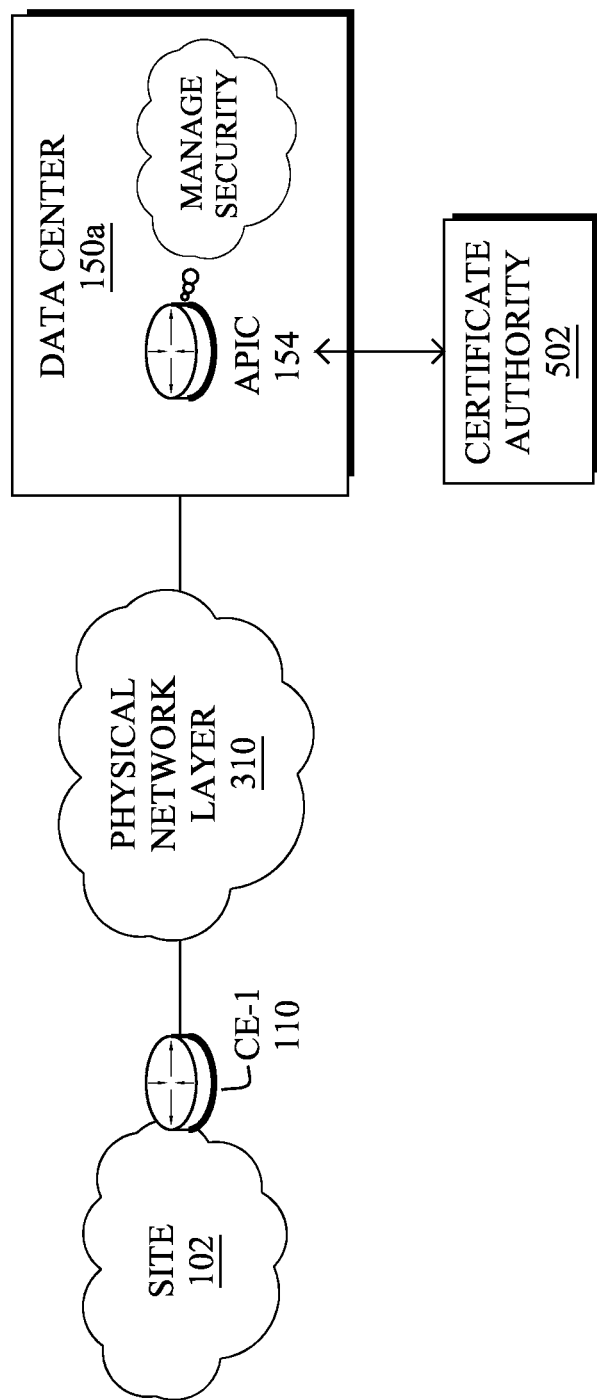
FIG. 5 illustrates an example of security mechanisms for an intelligent WAN.

Referring now to FIG. 5, example IWAN security mechanisms are shown, according to various embodiments. In some aspects, the techniques herein provide automated, secure methods and manageability for admitting trusted devices to the WAN network overlay (e.g., overlay layer 320 described above). Further, the techniques herein may also provide for automated encryption, to ensure confidentiality and allow users to securely connect to applications/services in a private data center, virtual private data center, and/or the public cloud.

There are two key objectives to establishing trusted admission of a device to the network: 1.) establishing a secure identity of the device, and 2.) establishing confidentiality of data transmission across the VPN overlay. The first objective ensures that devices added to the overlay are trusted. Notably, if an attacker is able to establish trust and be admitted to the VPN, this may compromise data confidentiality. The second objective ensures that the tunnel encryption keys (e.g., for the IPSec tunnels) cannot be compromised. For example, as shown, an APIC 154 or other network controller may be responsible for ensuring the identity of devices to be added to the overlay (e.g., CE-1, etc.), as well as managing the encryption keys used by these devices to form the tunnels of the overlay. In some embodiments, the network controller or other security device may also employ a certificate authority 502, to issue security certificates, in accordance with the techniques herein.

In one embodiment, the network may use a public key infrastructure (PKI) mechanism, to automatically establish the trusted identity of device such as, e.g., through the use of X.509 certificates to securely identify the device. This secure identity may also be used to drive the tunnel encryption, to ensure data confidentiality within the VPN overlay tunnels, either dynamically or on demand. In one embodiment, the Internet Key Exchange (IKE) protocol may be used to automatically manage and distribute tunnel session keys between secure endpoints (e.g., routers participating in the overlay), so that the confidentiality of the traffic is maintained and cannot be compromised by an attacker, even with brute-force, massive-compute based attacks.

In various embodiments, the VPN tunnel overlay (e.g., overlay layer 320) may provide any or all of the following:
Standards-based PKI for establishing secure identity;
Automated session key distribution and management with IKEv2: automatic session key generation, rollover and prepositioning to ensure uninterrupted transmission;
Secure admission to the network based with installer-based or machine-based credentials (e.g., credentials stored on CE-1, etc.);
NSA Suite-B cryptography and authentication for highest degree of data-plane confidentiality commercially available;
Automated PKI certificate deployment and IPSec or other VPN tunnel configuration;
Transport independence and with any-to-any, secure mesh connectivity;
Network-level resiliency; and
Be fully tested to meet security industry compliance standards.

As would be appreciated, deploying a secure WAN infrastructure across thousands of endpoints can be a significant challenge without the use of automated methods. For example, using pre-shared keys as a basis for secure identity and authentication may be easy to configure, but becomes extremely challenging to refresh these keys to ensure continued security of identity and protection against unauthorized use of trusted devices such as branch routers. In various embodiments, the architecture herein may use PKI methods to establish trusted identity. PKI uses secure, established asymmetric key (public/private) exchange methods and digital signatures, to ensure trusted identity of devices that will be admitted to the network.

The security mechanisms herein may also be adapted to support an automated, "plug-and-play" deployment of devices within the overlay. For example, router CE-1 or other devices joining the overlay may store 802.1ar Secure Device Identity information with secure credentials and certificates. These embedded credentials can be used to automate the process of authenticating the device to the network and removing the need for the installer to establish trust via the manual entry of credentials.

In various embodiments, the security mechanisms herein may be automated using any or all of the following elements:

PKI Server—a router-based server (e.g., server 502) for distributing enterprise PKI certificates to remote site routers (e.g., to CE-1). In one embodiment, the PKI Server may have one or more interfaces to third-party certificate authorities.

PKI Broker—a service embedded in the APIC (e.g., APIC 154) controller software to further automate the enrolment process by automatically validating the certificate and serial number of the device to be admitted to the network (e.g., CE-1, etc.).

Plug-and-Play Service—a service that allows for zero-touch secure, VPN configuration (e.g., as executed by CE-1, etc.).

Lifecycle Management Service—a service (e.g., as run by APIC 154, etc.) that manages certificate revocation, renewal, and/or rollover.

As would be appreciated, the architecture described herein also delivers an automated, secure method to transition from a device-based trust model into the localized trust model described herein. This transition ensures that the machine-based credential (e.g., an 802.1ar certificate, etc.) is replaced with an enterprise certificate. Without this step, local enterprise policies cannot be enforced nor can certificates be revoked.

During operation, the branches or other endpoints (e.g., CE-1, etc.) may obtain authenticated, cryptographic keys via a secure channel/tunnel. Session keys provide the information needed to encrypt the communication itself. In some embodiments, the architecture herein may also use the IKEv2 protocol or another key exchange protocol, which offers perfect forward secrecy, identity protection, and establishes mutual authentication. IKEv2 also has additional properties that allows for Denial of Service (DoS) protection, and local policy driven key refreshing. In addition, the architecture herein may also support centralized pairwise-key distribution and management via centralized key services embedded in the APIC controller.

Figure 6:
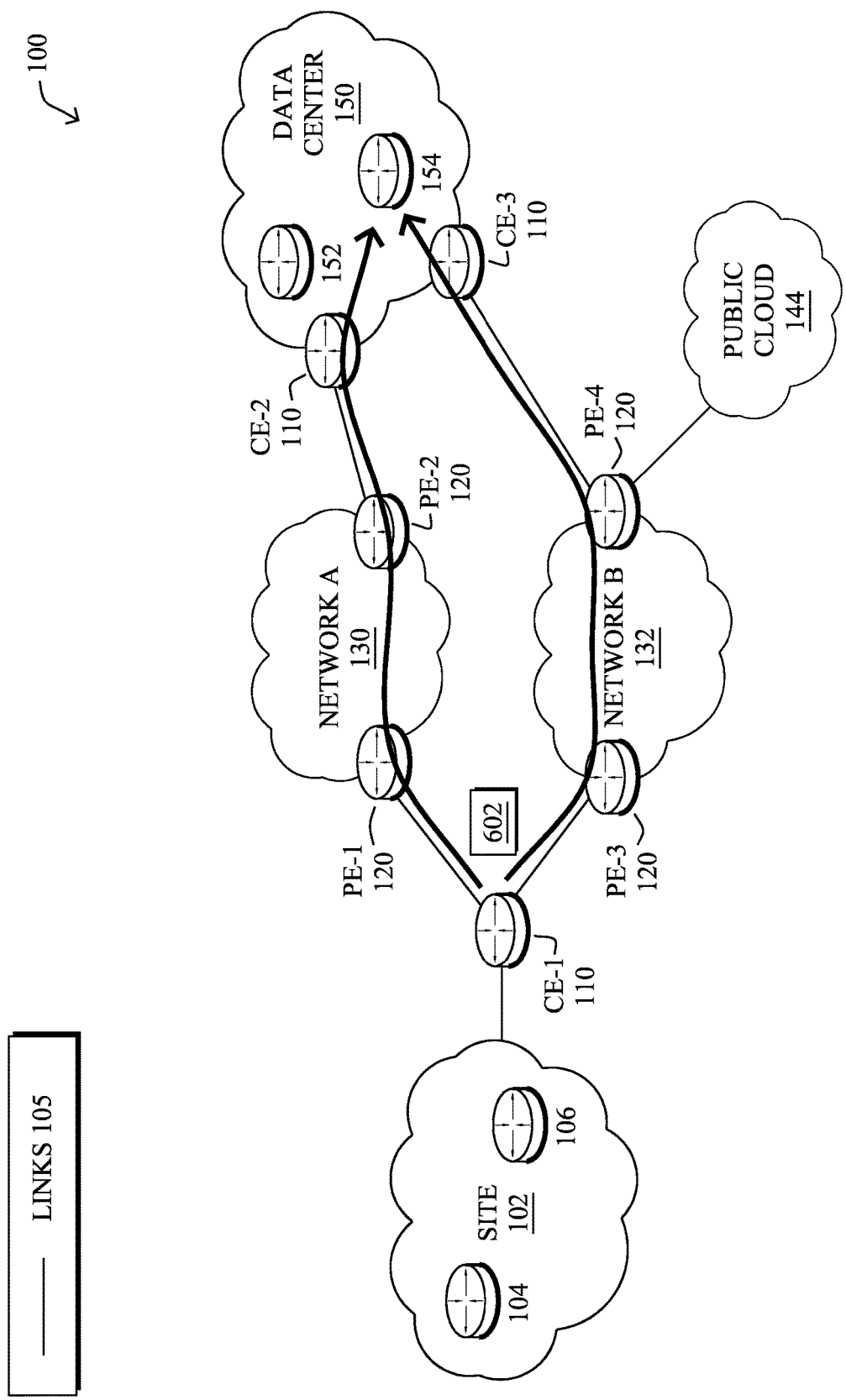
FIG. 6 illustrates an example of path control in an intelligent WAN.

Referring now to FIG. 6, an example of traffic being sent within communication system 100 is shown, according to various embodiments. As shown, assume that device 104 or 106 at site 102 is to communicate network traffic 302 with a particular device in data center 150 (e.g., device 154). Also as shown, assume that network 130 is an MPLS network and that network 132 is an Internet service provider's network that also allows devices 104 and 106 at site 102 to access other devices in public cloud 144 (e.g., public webservers, etc.). In some embodiments, CE router CE-1 may be configured to select between the use of network 130 and network 132 to communicate traffic 602 with device 154 in data center 150. For example, in some cases, CE-1 may establish VPN tunnels to data center 150 via either or both of both MPLS network 130 and via the Internet using network 132. In turn, CE-1 may send high priority traffic over the "premium" path via MPLS network 130 and may use network 132 to load balance any lower priority traffic via the Internet.

In various embodiments, intelligent path control may be implemented using the PfR mechanisms of the network. For example, one or more of the devices shown in FIG. 6 may operate as a PfR domain controller that provides path and service orchestration services. For example, such a PfR mechanism may be implemented as part of the control plane and executed on one or more of the routers (e.g., CE-1, etc.) and/or other devices (e.g., a network controller in data center 150, etc.). The domain controller may be operable to discover the transport network topology and/or available paths in the network between branches, campuses, and/or data center endpoints. In addition, such a controller may advertise prefixes, path control policies, and/or set up monitoring services on one or more router elements in the domain (e.g., CE-1 may be instructed to monitor certain traffic).

To facilitate path selection and flow load balancing in the network, additional paths/tunnels may be set up within the overlay layer (e.g., overlay layer 320). In turn, the PfR mechanism may control how the actual flows are mapped to the paths. In doing so, path selection and load balancing may be separated from the IP routing/physical network layer (e.g., layer 310), allowing techniques such as policy-based routing (PBR), equal cost multipath (ECMP), metrics/weights, and/or other techniques to provide path control and load balancing in the overlay layer. Notably, in some embodiments, the IP routing layer/physical network layer may be used strictly to set up diverse paths through the transport network for the overlay tunnels.

Figure 7:
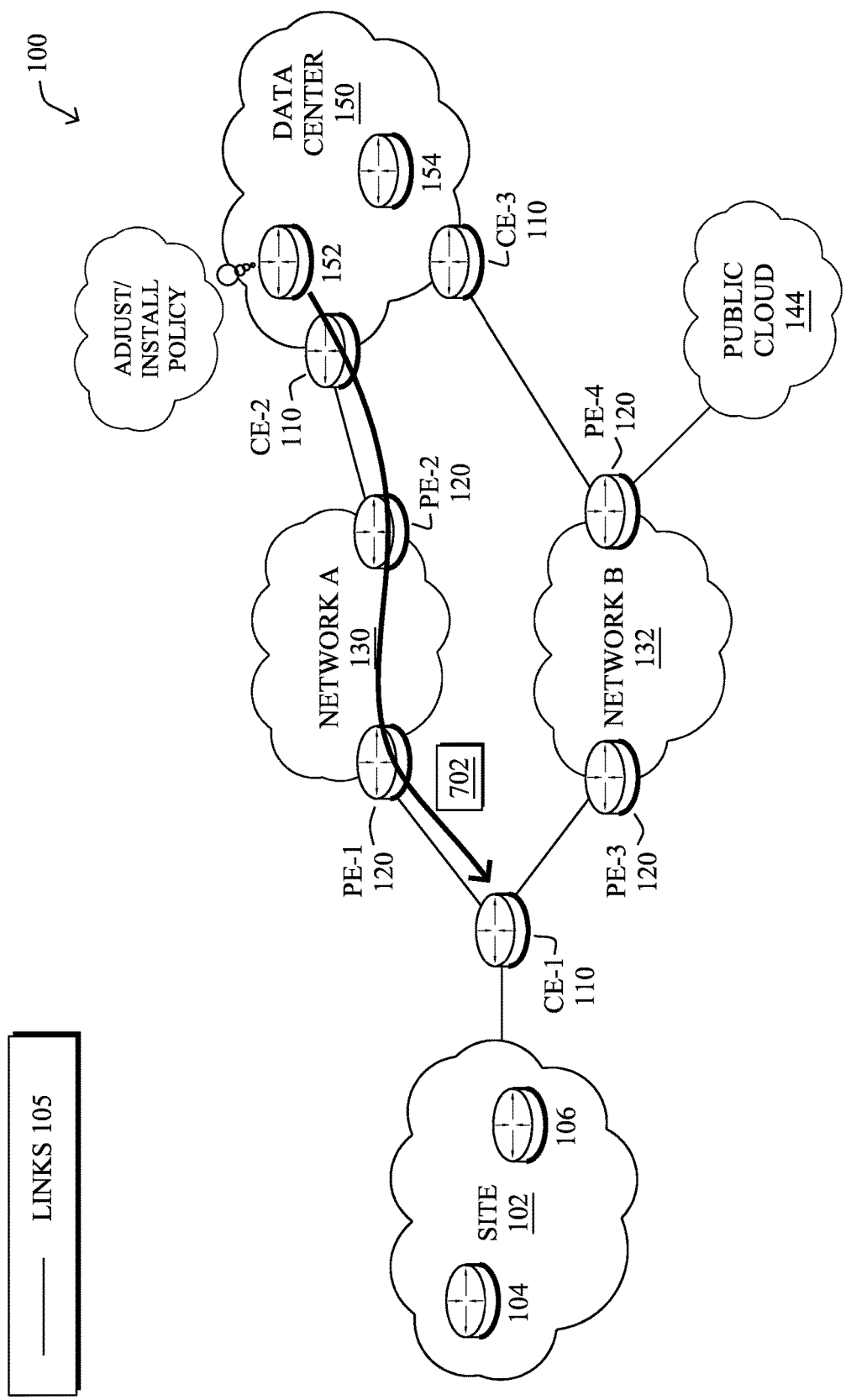
FIG. 7 illustrates an example of policy control in an intelligent WAN.

Referring now to FIG. 7, an example of policy control in an IWAN is shown, according to various embodiments. As described above, routing decisions and path flow control may be performed at the VPN overlay layer, as opposed to the IP routing/physical network layer. As shown, a network controller may install and/or adjust the policies used by the routers for purposes of gathering performance metrics, making path flow decisions, etc. For example, as shown, a network controller may provide a policy 702 to router CE-1 that may control when CE-1 is to gather performance metrics, which performance metrics CE-1 is to gather, information that may be used by CE-1 to make routing decisions such as, e.g., quality of service (QoS) information, etc.

A policy pushed to a router (e.g., policy 702 pushed to CE-1) may comprise any or all of the following:

Traffic engineering policies: such policies may allow the router to select paths based on service chaining metadata, etc.

Identity-based policies: such policies may allow a router to select paths and segmentation based on user ID information. For example, a particular policy may group all guest users together and set a policy to route guest user traffic via a Direct Internet Access (DIA) interface.

Domain-based path policies: such policies may allow the router to select paths to domains in the public cloud (e.g., public cloud 144), such as software as a service (SAAS) service domains. In particular, such path selections may be based on business level policy intent, as opposed to IP routing level design and control. These policies may be used to direct these flows onto a DIA path, as desired.

Additionally, the devices shown may incorporate any or all of the following, to enhance routing decisions made at the overlay layer:

Service-awareness: routing devices may be aware of the transport type such as, e.g., bandwidth services (e.g., T1, Ethernet, etc.) or tiered, usage-based services such as, e.g., 3G/4G metered services.

Controller based domain services: in some embodiments, the domain controller may be integrated into APIC as a service.

Single-ended path optimization: such a feature may optionally allow both sides of a particular flow to be bound to the same path in the network. This allows the overlay to route flows to certain applications that are required to see both sides of the flow (e.g., firewall, AVC, etc.).

In some embodiments, traffic decisions may be made to optimize traffic on a per-application basis. In particular, the networking devices may be operable to perform application discovery (e.g., to identify the type of application traffic, etc.) and measure performance metrics for the various applications' traffic flows. Such application-centric discovery techniques may include:

Reverse DNS and DNS-AS methods: in some cases, a device may associate a particular traffic flow with a particular application based on the address(es) used by the flow.

Moving application discovery as close to the client as possible.

Injecting application ID metadata into a packet, to allow APP ID discovery only at the edge of the network.

Less reliance on "snooping" and packet inspection-based methods of gleaning information from transiting IP packets. Notably, encryption used according to the techniques herein may render packet inspection techniques useless.

In some embodiments, performance metrics may be exported to business intelligence tools and applications that can run on top of the APIC controller. In one embodiment, the APIC may provide services to interface business intelligence tools to the network information flows or the business intelligence tools may be operated in a standalone manner based on collected metrics. In another embodiment, wide area application services (WAAS) and/or QoS mechanisms may be integral to the network, with the only exposure being via an application-level policy. In other words, QoS policies and classifications may be control programmatically through the network controller and the user is not expected to interact with QOS mechanism. Similarly, for WAAS, once applications are discovered, WAAS optimizations may be available and used to generate optimized policies that may be provided to the network elements. In yet another embodiment, application response time measurement may be moved off the main data path and virtualized.

In some embodiments, the techniques herein may allow for enterprise network functions to be virtualized. In particular, various network functions such as routing, firewalling, path control, etc., may be virtualized on a computer-based platform (e.g., on a blade server, etc.). In doing so, endpoints may be as generic as possible, thereby allowing the endpoints to be customized by pushing networking or service applications to the endpoints in an automated manner. In addition, virtualizing network elements/functions may facilitate software updates, such as removing the typically long and expensive qualification cycles through which operating system releases must undergo to be deployed, as well as removing the corresponding downtime needed for such a deployment.

In some embodiments, service policies (e.g., policy 702, etc.) may define the networking applications needed at the branch and campus sites. The deployment of these applications may be orchestrated by the network controller in the same way that user and traffic policies are orchestrated. For example, networking-related applications may be removed from the typically monolithic software images used today, containerized, and made available to the endpoints as virtual machines (VMs) that can be run on top of a standard hardware service/control plane. The host operating system or hypervisor may be operable to implement a consistent service chaining of these features. In other words, virtualized networking functions may be enabled via a software push mechanism, allowing for the use of smaller applications that are more self-contained and easier to validate.

Thus, various aspects of the techniques herein provide the following:

Automation: In some aspects, the controller-based architecture described herein may facilitate centralization of the "right" control plane services, to enable network abstraction, business policy level control of the network services, and automation of the network setup. In some aspects, application-centric mechanisms may be deployed across the WAN, campus(es), and branch(es), so that applications can be provisioned from end-to-end using the appropriate network services (e.g., QoS, path control, overlay, etc.) as needed, to deploy the application across the network. In addition, pre-configured network elements may be automatically added to the network overlay layer. In some cases, the devices can be further personalized via APIC controller based policies, once the control overlay has been established.

Cloud Integration: The techniques herein also support application VM mobility, allowing application workloads to be shifted between data center subnets. In addition, the seamless application migration techniques herein may also support inter-cloud mobility and support cloud bursting, whereby an enterprise can deploy applications in a virtual private cloud and later move the application workload to private data centers, when in-house capacity is ready or resources are available to in-source the workload.

Service Virtualization: The techniques herein further allow for networking services (e.g., routing, firewall, anti-malware, etc.) to be virtualized and rolled out in a similar manner as business applications in a data center. Network function virtualization and business policy-driven deployment may be provided by the APIC, along with proper service chaining of these services, to simplify and automate the service deployment to branches and campuses.

Self-Learning Networks: In some embodiments, self-learning techniques may be employed with the techniques herein, to perform big-data mining of dynamic network characteristics and patterns over long time. Notably, machine learning techniques may be used to recognize patterns such as traffic busy hour congestion periods, DoS attacks, and other pattern-based network characteristics, with the ability to learn and predict future performance and traffic anomaly detection. Such predictions may allow the network to adjust its behavior automatically, to avoid outages or performance degradation.

Figure 8:
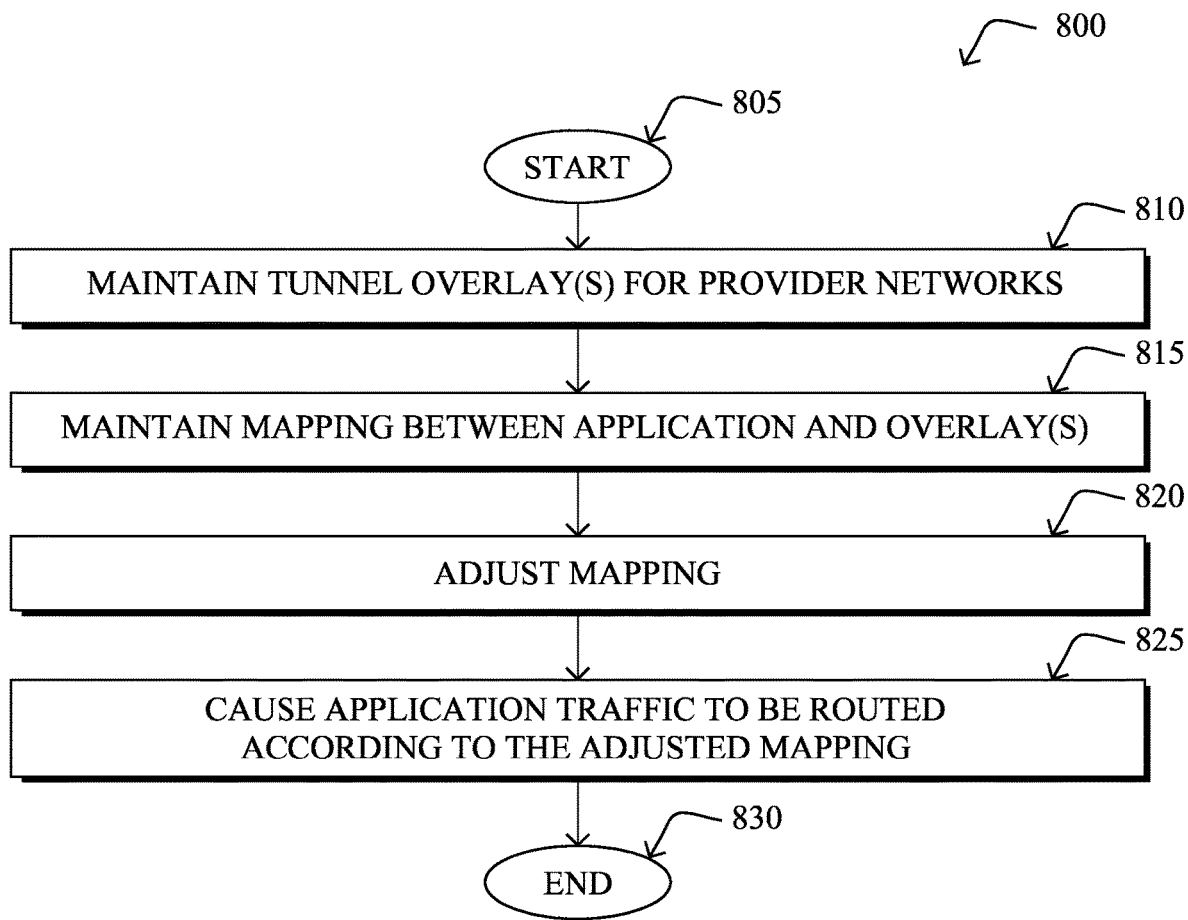
FIG. 8 illustrates an example simplified procedure for causing traffic to be routed in a communication network.

FIG. 8 illustrates an example simplified procedure for causing traffic to be routed in a communication network, according to various embodiments. In general, procedure 800 may be performed by any of the devices described herein (e.g., device 200) by executing the corresponding instructions (e.g., IWAN process 248, etc.). Procedure 800 may begin at step 805 and continue on to step 810 where, as described in greater detail above, the device may maintain one or more tunnel-based overlays for a set of provider networks. For example, such a VPN-based overlay may be maintained across any number of ISP networks, MPLS networks, cellular networks, Metro-E networks, or the like.

At step 815, as detailed above, the device may maintain a mapping between a particular application and the overlay. In some embodiments, the mapping may map an enterprise/global address used across the overlay to routing/address information used at the physical network layer. In addition, the mapping may facilitate making routing decisions at the overlay level, as opposed to at the IP routing/physical network level.

At step 820, the device may adjust the mapping, as described in greater detail above. For example, assume that the device receives an indication that the application/service is migrating to a device in a different data center, in the cloud, etc. In such a case, the device may adjust the mapping to allow for the enterprise/global address for the application to be maintained, even if the application server migrates across different subnets. Such a technique may allow for the dynamic shifting of application workloads across data centers and may enable cloud bursting to be employed within the network.

At step 825, as detailed above, the device may cause traffic associated with the application to be routed according to the adjusted mapping. In particular, by providing an interface between the application layer and the overlay layer (e.g., via APIs, control messages, etc.), the device may dynamically adjust the overlay to allow for the dynamic movement of the application across the network. Procedure 800 then ends at step 830.

It should be noted that while certain steps within procedure 800 may be optional as described above, the steps shown in FIG. 8 are merely examples for illustration and certain other steps may be included or excluded as desired. Further, while a particular order of the steps is shown, this ordering is merely illustrative, and any suitable arrangements of the steps may be utilized without departing from the scope of the embodiments herein.

The techniques described herein, therefore, provide for a transport independent architecture, intelligent path selection, application-centric performance optimization, and secure connectivity using different transport links at a branch (e.g., to different provider networks). In some aspects, the techniques herein allow for premium-priced WAN services (e.g., MPLS, etc.) to be enhanced with lower cost data transport links (e.g., Internet), without sacrificing network requirements. Front-door VRF techniques may be used to separate service provider address spaces from the enterprise address space, allowing for minimal peering with a service provider, complete address space separation, as well as protection against attacks/threats from Internet connections via isolation of the internet interface from the internal enterprise routing table. Notably, the techniques herein separate functions (e.g., transport, path control, application policy, etc.) in a way that allows each to be put into place independently, thus minimize design dependencies between each layer. The separation of path control from routing allows application behavior to be decoupled and managed at the policy layer, independent of the underlying transport protocols and routing overlay protocols, allowing the customer networking team to set up the overlay and not change it as applications are added, removed, or changed across the network. Additionally, WAN routing may automatically adapt to data center workloads being moved within the private cloud and between private and public SAAS infrastructure.

In further aspects, the techniques herein provide for automated route map filtering for loop avoidance, automatic application of path metrics for default transport path selection when path control layer is down, automatic setting of timers at the transport, path control and IPSec layers to ensure a working system with properly tuned reaction times during protection events, as well as minimization of keep alive loading on devices. This approach also allows for testing and quality assurance at the solution/use case level rather than the feature level. Policies extended from the data center to the various branches may also allow for islands/silos of policies to operate collectively from a policy point of view. This allows non-IT proficient staff (e.g., business application administrators) to deploy new applications without the need for intervention by networking staff, leading to faster rollouts.

While there have been shown and described illustrative embodiments that provide for an intelligent WAN architecture, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of network configurations. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
maintaining, by a device, one or more tunnel-based overlays for a communication network for each application of a plurality of applications, wherein the communication network comprises two or more physical provider networks;
maintaining, by the device, a mapping between a particular application of a plurality applications and the one or more tunnel-based overlays for the communication network;
adjusting, by the device, the mapping between the particular application and the one or more tunnel-based overlays for the communication network, wherein adjusting the mapping between the particular application and the one or more tunnel-based overlays for the communication network comprises:
receiving, at the device, an indication that an endpoint for the particular application is migrating from a first network domain to a second network domain, wherein the second network domain is a different network than the first network domain; and
dynamically adjusting, in response to receiving the indication, routing information associated with the particular application to cause traffic for the particular application to be routed to the second network domain;

causing, by the device, one or more routers in the communication network to route the traffic for the particular application according to the adjusted mapping between the particular application and the one or more tunnel-based overlays for the communication network; and causing, by the device, a particular router of the one or more routers to maintain 1) a global virtual routing and forwarding (VRF) instance for user traffic routing and 2) one or more separate VRF instances corresponding to each interface of the two or more physical provider networks for tunnel establishment.

2. The method as in claim 1, wherein the mapping between the particular application and the one or more tunnel-based overlays for the communication network comprises:

an enterprise network address associated with the particular application that is within an enterprise address space.

3. The method as in claim 2, wherein the routing information comprises routing information for the enterprise network address that comprises one or more addresses that are within address spaces of the two or more physical provider networks.

4. The method as in claim 1, wherein the first and second network domains correspond to separate data centers, virtual private data centers, or Internet as a service (IaaS) providers.

5. The method as in claim 1, wherein causing the particular router to maintain the global VRF instance and the one or more separate VRF instances comprises:

causing, by the device, the particular router to maintain the global VRF instance and a front door VRF (fVRF) instance.

6. The method as in claim 1, wherein adjusting the mapping between the particular application and the one or more tunnel-based overlays for the communication network comprises:

determining, by the device, that the traffic for the particular application should be routed via a different one of the two or more physical provider networks; and causing, by the device, the routing information to be adjusted to route the traffic for the particular application via the second network domain.

7. The method as in claim 6, wherein determining that the traffic for the particular application should be routed via a different one of the two or more physical provider networks comprises:

receiving, at the device, one or more performance metrics associated with the traffic for the particular application.

8. The method as in claim 1, wherein causing the one or more routers in the communication network to route traffic for the particular application according to the adjusted mapping between the particular application and the one or more tunnel-based overlays for the communication network comprises:

providing, by the device, one or more policies to the one or more routers, wherein the one or more routers make routing decisions for the traffic for the particular application according to the one or more policies.

9. The method as in claim 1, wherein a first of the two or more physical provider networks comprises a multiprotocol label switching (MPLS) network, an Internet service provider (ISP) network, a cellular network, or a metropolitan-area Ethernet (Metro-E) network, and wherein a second of the two or more physical provider networks comprises an MPLS network, an ISP network, a cellular network, or a Metro-E network.

10. An apparatus, comprising:

one or more network interfaces to communicate with a communication network;

a processor coupled to the one or more network interfaces and configured to execute a process; and a memory configured to store the process, the process when executed operable to:

maintain one or more tunnel-based overlays for the communication network for each application of a plurality of applications, wherein the communication network comprises two or more physical provider networks;

maintain a mapping between a particular application of the plurality of applications and the one or more tunnel-based overlays for the communication network;

adjust the mapping between the particular application and the one or more tunnel-based overlays for the communication network, wherein the apparatus adjusts the mapping between the particular application and the one or more tunnel-based overlays for the communication network by:

receiving an indication that an endpoint for the particular application is migrating from a first network domain to a second network domain, wherein the second network domain is a different network than the first network domain; and dynamically adjusting, in response to receiving the indication, routing information associated with the particular application to cause traffic for the particular application to be routed to the second network domain;

cause one or more routers in the communication network to route the traffic for the particular application according to the adjusted mapping between the particular application and the one or more tunnel-based overlays for the communication network; and cause a particular router of the one or more routers to maintain 1) a global virtual routing and forwarding (VRF) instance for user traffic routing and 2) one or more separate VRF instances corresponding to each interface of the two or more physical provider networks for tunnel establishment.

11. The apparatus as in claim 10, wherein the mapping between the particular application and the one or more tunnel-based overlays for the communication network comprises:

an enterprise network address associated with the particular application that is within an enterprise address space.

12. The apparatus as in claim 11, wherein the routing information comprises routing information for the enterprise network address that comprises one or more addresses that are within address spaces of the two or more physical provider networks.

13. The apparatus as in claim 10, wherein the first and second network domains correspond to separate data centers, virtual private data centers, or Internet as a service (IaaS) providers.

14. The apparatus as in claim 10, wherein the apparatus causes the particular router to maintain the global VRF instance and the one or more separate VRF instances by:

causing the particular router to maintain the global VRF instance and a front door VRF (fVRF) instance.

15. The apparatus as in claim 10, wherein the apparatus adjusts the mapping between the particular application and the one or more tunnel-based overlays for the communication network by:
- determining that the traffic for the particular application should be routed via a different one of the two or more physical provider networks; and
- causing the routing information to be adjusted to route the traffic for the particular application via the second network domain.

16. The apparatus as in claim 15, wherein determining that the traffic for the particular application should be routed via a different one of the two or more physical provider networks comprises:
- receiving one or more performance metrics associated with the traffic for the particular application.

17. The apparatus as in claim 10, wherein the apparatus causes the one or more routers in the communication network to route traffic for the particular application according to the adjusted mapping between the particular application and the one or more tunnel-based overlays for the communication network by:
- providing one or more policies to the one or more routers, wherein the one or more routers make routing decisions for the traffic for the particular application according to the one or more policies.

18. The apparatus as in claim 10, wherein a first of the two or more physical provider networks comprises a multiprotocol label switching (MPLS) network, an Internet service provider (ISP) network, a cellular network, or a metropolitan-area Ethernet (Metro-E) network, and wherein a second of the two or more physical provider networks comprises an MPLS network, an ISP network, a cellular network, or a Metro-E network.

19. A tangible, non-transitory, computer-readable media having software encoded thereon, the software when executed by a processor on a device in a communication network operable to:
- maintain one or more tunnel-based overlays for the communication network for each application of a plurality of applications, wherein the communication network comprises two or more physical provider networks;
- maintain a mapping between a particular application of the plurality of applications and the one or more tunnel-based overlays for the communication network;
- receive performance metrics associated with the particular application;
- adjust the mapping between the particular application and the one or more tunnel-based overlays for the communication network, wherein the mapping is adjusted between the particular application and the one or more tunnel-based overlays for the communication network by:
  - receiving an indication that an endpoint for the particular application is migrating from a first network domain to a second network domain, wherein the second network domain is a different network than the first network domain; and
  - dynamically adjusting, in response to receiving the indication, routing information associated with the particular application to cause traffic for the particular application to be routed to the second network domain;
- cause one or more routers in the communication network to route the traffic for the particular application according to the adjusted mapping between the particular application and the one or more tunnel-based overlays for the communication network; and
- cause a particular router of the one or more routers to maintain 1) a global virtual routing and forwarding (VRF) instance for user traffic routing and 2) one or more separate VRF instances corresponding to each interface of the two or more physical provider networks for tunnel establishment.

20. The tangible, non-transitory, computer-readable media of claim 19, wherein the particular application is one of a video application, an audio application, an enterprise resource planning application, and a customer relationship management application.

* * * * *